United States Patent [19]

Rollins et al.

[11] 4,372,531

[45] Feb. 8, 1983

[54] CERAMIC GATE VALVE AND COMPONENTS THEREFOR

[75] Inventors: M. Jack Rollins; William P. Coppin, both of Muncie, Ind.

[73] Assignee: Maxon Corporation, Muncie, Ind.

[21] Appl. No.: 207,858

[22] Filed: Nov. 18, 1980

[51] Int. Cl.³ ............................................ F16K 25/00
[52] U.S. Cl. ................................. 251/174; 251/196; 251/328; 251/368; 267/165
[58] Field of Search ............. 251/174, 196, 328, 368; 267/164, 165

[56] References Cited

U.S. PATENT DOCUMENTS

| | | | |
|---|---|---|---|
| 1,899,925 | 3/1933 | Brofelth | 267/165 X |
| 2,480,529 | 8/1949 | Waag | 251/174 OX |
| 3,414,233 | 12/1968 | Priese | 251/174 X |
| 4,033,550 | 7/1977 | Wheatley | 251/328 |
| 4,161,309 | 7/1979 | Klyee | 251/328 |
| 4,266,566 | 5/1981 | Kacal | 251/174 X |

FOREIGN PATENT DOCUMENTS 1125244  3/1962  Fed. Rep. of Germany ...... 251/174

Primary Examiner—Harold W. Weakley
Attorney, Agent, or Firm—Robert M. Ward

[57] ABSTRACT

The present invention comprises an improved ceramic gate valve having within the valve housing a ceramic valve gate, which is surrounded by a peripherally disposed compression band for providing strength thereto, and which is engaged by a pair of ceramic valve seats, which are in turn urged inwardly for such engagement by ceramic springs. The ceramic springs comprise a plurality of plates of ceramic material separated by spacers which are disposed in a staggered array to form the ceramic spring.

18 Claims, 10 Drawing Figures

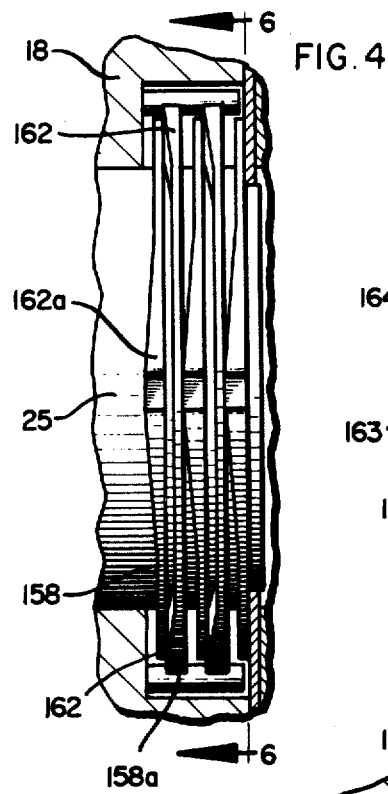
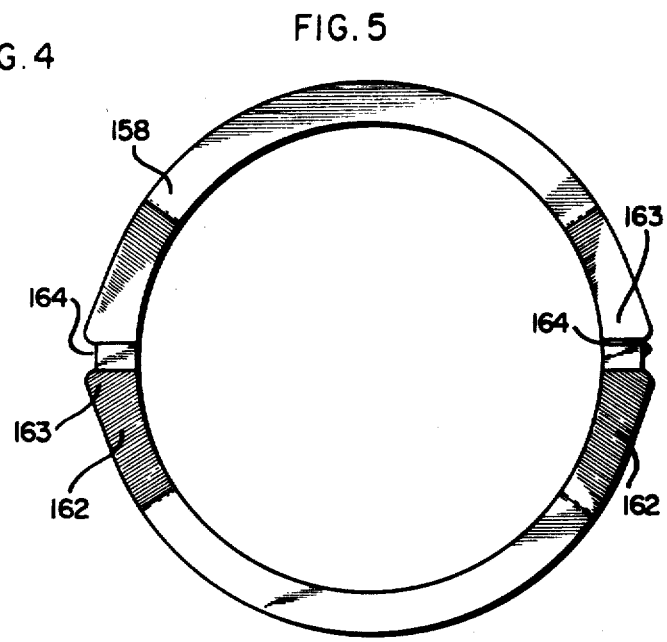
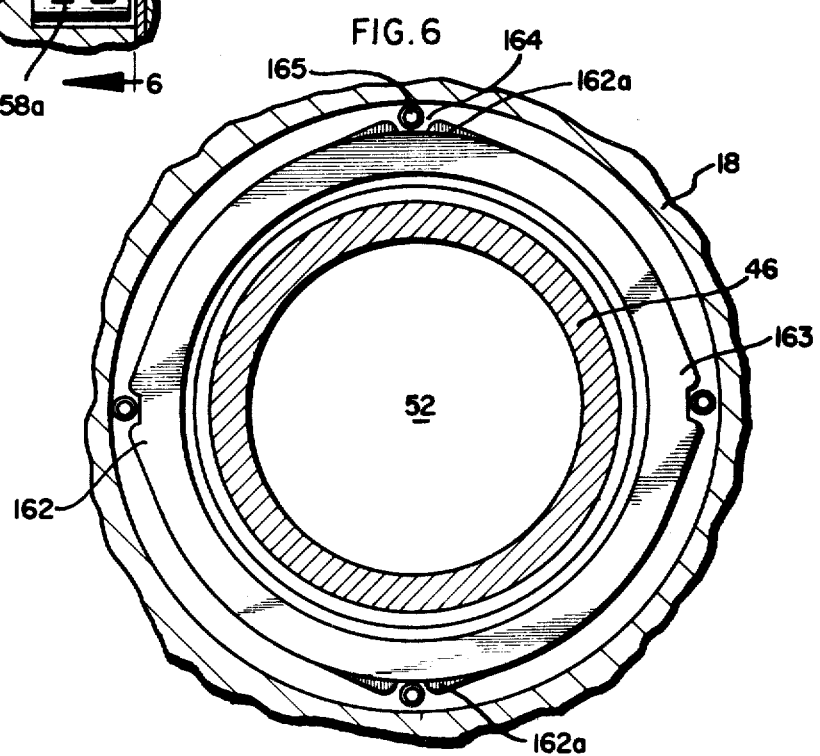

CERAMIC GATE VALVE AND COMPONENTS THEREFOR

BACKGROUND OF THE INVENTION

The present invention relates generally to ceramic valves, and is directed in particular to an improved ceramic gate valve being formed from ceramic functional components for use in controlling the flow of high temperature and/or corrosive fluids.

In the prior art, a popular and useful form of valve structure is the gate valve, which has been widely used due to its favorable characteristics of ease and responsiveness of operability, control of flow, and efficient sealing qualities for closing off the flow in the conduit pipe. Typically, in the prior art such gate valves have been formed of metallic materials which have had a limited use for certain applications where high temperature and/or corrosive fluids were to be conducted through the conduit pipe. Continued use of the metallic gate valves in such environments has resulted in degradation of the metallic components, such as the valve gate and valve seat, due to chemical action. Yet additionally, the metallic springs that have been used to urge the valve seat into sealing engagement with the valve gate have become rapidly annealed, and thus rapidly lose usefulness as springs in high temperature environments. These and other difficulties render such prior art metallic gate valve structures to be of limited usefulness and/or useful life in these environments.

One attempt to solve these problems has been the use of ceramic components for the functional parts of the gate valve which come in contact with the corrosive and/or high temperature environment. One such attempt is proposed in U.S. Pat. No. 3,614,061. However, under this approach to a valve structure it has been necessary to eliminate entirely the spring means for urging the valve seat into operable and sealing engagement with the valve gate. Perhaps while ameliorating somewhat the problems associated with the prior art metallic valve gate structures, this proposed structure has introduced a new and even more fundamental debilitating characteristic rendering the apparatus to be of limited usefulness. This is the characteristic of incorrect pressure exerted by the valve seat on the valve gate. If the valve seat is made too small in thickness, there is insufficient pressure on the valve gate in the closed position and leaking of the valve results. If the valve seat is made too thick, the valve gate experiences difficulty in being retracted and/or results in wearing owing to excessive friction during operation of the valve. Accordingly, the dimensions of the various components in order to be functional must be set forth with great precision, which leads directly to a less than optimal production cost of the apparatus, and reduces effective life when frictional wear inevitably occurs. At that point, the only solution to the newly created problem is to replace the worn components, which increases maintenance costs.

Accordingly, in view of the shortcomings and disadvantages of the prior art, it is an object of the present invention to provide an improved ceramic gate valve apparatus having a ceramic spring disposed exterior of the valve seat for urging the same into operable engagement with the valve seat at a sufficient pressure to effect proper sealing therebetween.

It is an additional object of the improved ceramic gate valve apparatus of the present invention to provide a structure which will accomplish optimal sealing characteristics, and will do so over an extended period of time.

It is also an object of the improved ceramic gate valve structure of the present invention to provide a ceramic spring urged valve which will maintain proper inward pressure and sealing engagement between the valve and the valve seat even at high and otherwise annealing temperatures.

These and other objects and advantages of the improved ceramic valve gate structure of the present invention will become more apparent upon a review of the description of the invention and preferred embodiments, the drawing, and the claims, as set forth hereinbelow.

BRIEF DESCRIPTION OF THE INVENTION

The improved ceramic gate valve apparatus of the present invention is directed to a gate valve for controlling the flow of fluids, especially those having a high temperature and/or corrosive characteristics, through a conduit pipe. The ceramic functional components are enclosed within a valve housing which is disposed on the conduit pipe and which contains a chamber therein for accommodating the valve gate in its open and closed positions as the valve gate reciprocates transversely across the longitudinal dimensions of the conduit pipe. A ceramic valve gate is disposed in the valve gate chamber and includes an aperture at one end for conducting the fluid therethrough when in the open position and a solid portion opposite the aperture for occluding and preventing the flow of the liquid through the valve.

A pair of valve seats are disposed on either side of the valve gate and engage the valve gate in a suitably snug engagement to prevent leakage therearound. Reciprocating means are connected to the valve gate for moving the same reciprocally from the open position to the closed position, vice versa, and at intermediate positions therebetween to control the flow of the fluid.

A ceramic spring is disposed exterior of each of the valve seats for providing an inward urging pressure thereon to effect a sufficient pressure of engagement by the valve seat pair on the valve gate disposed therebetween for preventing leakage. The ceramic springs comprise a plurality of ceramic plates each having a central hole therein, which plates are disposed in stacked array and separated from each other by groups of spacers. The spacers are disposed in staggered relationship, with a pair preferably disposed at 0° and 180° between the one ceramic plate and the next plate, and with a second group of spacers disposed at 90° and 270° between such next plate and the yet next plate, with this pattern being repeated for subsequent plates of the ceramic spring.

The ceramic plates may be in the shape of washers being circular in its exterior and interior diameters, or may be of any of various other exterior cross-sectional shapes. The spacers may be integrally formed on the ceramic plates or may be supplied in the form of discrete components, and may be formed from ceramic, metallic or other materials.

BRIEF DESCRIPTION OF THE DRAWING

FIG. 4 is an enlarged side view of an alternative preferred embodiment of the ceramic spring illustrating spacers integrally formed on the washer-shaped ceramic plates and disposed in staggered configuration;

FIG. 5 is a transverse view of the alternative preferred embodiment of the ceramic spring shown in FIG. 4, and further illustrating retaining bosses in the form of ear-like projections extending from the lateral surface of the peripheries of the ceramic plates and adjacent the integrally formed spacers;

FIG. 6 is an enlarged lateral cross-sectional view taken along line 6—6 of FIG. 4, and illustrates the staggered array of adjacent ceramic plates retained in stable radial configuration by means of pins engaging the ear-like projections of the receiving bosses;

DETAILED DESCRIPTION OF PREFERRED EMBODIMENTS

Figure 1:
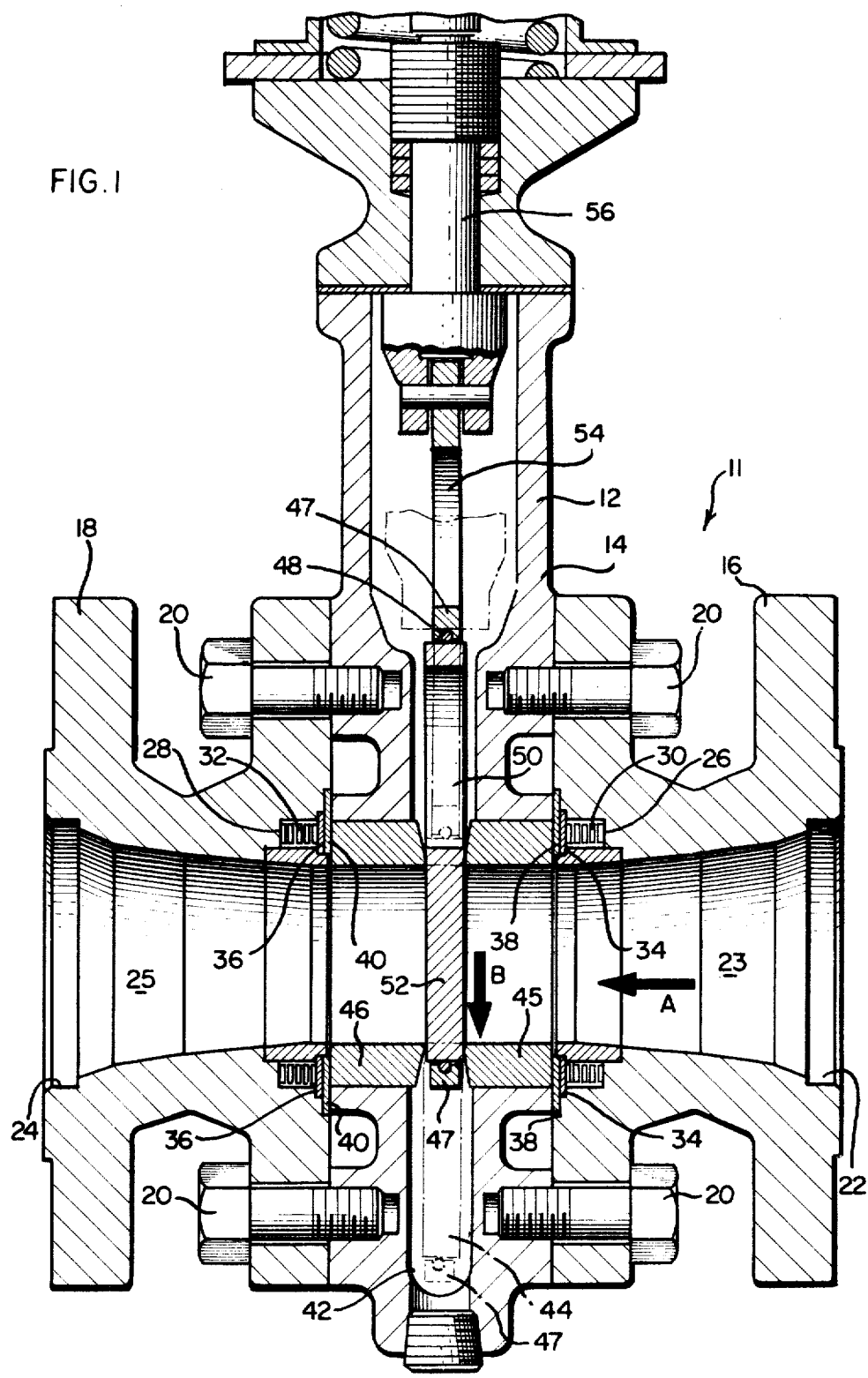
FIG. 1 is a partially fragmented longitudinal cross-sectional view through the improved ceramic gate valve of the present invention and showing a tri-part valve housing disposed on the conduit pipe connected together by bolts, the valve gate containing chamber together with the valve gate disposed in the closed position, and showing in phantom lines the valve gate disposed in the open position, the valve seat engaging the solid portion of the valve gate, the reciprocating means (partially fragmented), the compression means surrounding the peripheral lateral surface of the valve gate and separated therefrom by means of a Grafoil (flexible heat resistant material, such as Grafoil) band, and schematically showing the ceramic spring disposed exterior of the valve seat for urging the same into engaging relationship with the valve gate.

The improved ceramic gate valve apparatus of the present invention finds special application in embodiments for controlling the flow of high temperature and/or corrosive fluids through a conduit pipe. A valve housing is disposed on the conduit pipe and has an influent and effluent opening connected to the conduit pipe. The valve housing includes a chamber for accommodating the valve gate, which chamber is disposed tranverse to the longitudinal dimension of the conduit pipe.

The valve gate is disposed in the valve gate chamber for reciprocating movement between a first position to open the valve, and the second position to close the valve, and for positions intermediate the open and closed position to reduce and control the flow of the fluid through the conduit pipe. The valve gate is formed from a ceramic material and includes a valve gate aperture therein for permitting flow of the fluid therethrough when the valve gate is in the open position. The valve gate has a solid portion disposed opposite the valve gate aperture for closing the valve when the valve is in the second position.

A pair of valve seats are provided. Each of the valve seats is disposed on an opposite side of and engages the valve gate. The valve seat is formed from a ceramic material. Each valve seat has an opening therein to permit flow of the fluid through the conduit pipe when the valve is in the first, or open, position. Each of the valve seats is substantially stationary in the transverse dimension and is disposed in the housing for inward urging to effect snug engagement with the valve gate at a proper and selected force to prevent leakage, but yet to permit ready reciprocal operation of the valve gate.

Reciprocating means are connected to the valve gate for disposing the valve gate between the first and second positions respectively to open and close the valve.

Compression means surrounding the valve gate are provided to inwardly compress the peripheral surface of the valve gate to increase its strength and to prevent damage thereto.

A ceramic spring is disposed exterior of each of the valve seats for urging the valve seat inwardly toward and into engagement with the ceramic valve gate to effect a seal therebetween.

The housing chamber in preferred embodiments preferably includes a portion thereof for accommodating the aperture portion of the ceramic valve gate when the valve gate is in the second position and an oppositely disposed portion for accommodating the solid portion of the ceramic valve gate when the valve is in the second, or closed, position.

A solid washer is preferrably disposed between the ceramic valve seat and the ceramic spring means. Also, a flexible washer-shaped seal, preferably formed from a Grafoil (flexible heat resistant material, such as Grafoil) material, and having a larger external diameter than the solid washer, is disposed intermediate the solid washer and the ceramic valve seat at a portion near the internal diameter thereof for transmitting the inwardly urging force from the ceramic spring to the ceramic valve seat, and for sealing the housing.

Also in preferred embodiments, a retaining ring made of a flexible heat resistant material, such as Grafoil, is disposed intermediate the compression means on the valve gate peripheral surface to avoid shock due to the differing rates of thermal expansion and contraction of the compression means and the valve gate.

In preferred embodiments, the ceramic spring comprises a plurality of washer-shaped ceramic plates, each of which is deformable under an applied load of a selected amount, and being resilient upon removal of the load, to return the plate to the unloaded configuration. The plurality of these ceramic plates is disposed in a longitudinally stacked array to exert a collective force for opposing the applied load. Spacer means are disposed between adjacent ceramic plates in the stacked array. Each of the spacers has a thickness for defining the separation between the adjacent spring plates in the longitudinally stacked array. Each of the spacers has a width dimension sufficient to contact adjacent ceramic plates at a limited radial portion thereof. A group of at least two of these spacers is disposed in spaced radial relationship between the peripheral portions of each pair of adjacent ceramic plates. Each such group of the spacers is preferably evenly disposed radially around the adjacent ceramic plates. Each group of the spacers is also disposed in staggered array along the longitudinal stack of ceramic plates, whereby no group of spacers is disposed directly longitudinally in line with the next group of spacers in the stack of ceramic plates and spacers, in order to retain the spring function of each of the plates in the ceramic spring.

In preferred embodiments, the ceramic plates have a circular washer-like shape and the central hole therein is circular in shape and of substantially the same diameter as the aperture in the valve gate. However, other exterior shapes are contemplated.

Preferably, a pair of the spacers are disposed at 0° and 180° respectively to each other, and the next group of spacers are disposed at 90° and 270°, with subsequent groups of spacers repeating this opposite and staggered relationship. The result is to sum the resilient force of the ceramic plates and to direct the same onto the applied load. In preferred embodiments, each group of spacers separates two ceramic plates which are disposed in facing relationship to each other.

The spacers may be formed of discrete tabs and may be formed from a heat and corrosion resistent metallic substance or a ceramic material. In an alternative preferred embodiment, the spacers may be integrally formed on the ceramic plates in the form of protuberances on the facing surfaces of the periphery of the ceramic plates.

Each of the ceramic plates in those alternative preferred embodiments has a pair of integrally formed retaining bosses for indexing the plates into a stacked array having a substantial radial and lateral stability and to resist twisting disorder of the stacked and staggered spacer array, the result of which would be to reduce the spring function of the ceramic spring. These retaining bosses preferably comprise ear-like projections having a pin receiving opening therein. Such ear-like projections in preferred embodiments extend from the lateral peripheral surfaces of the ceramic plates. Retaining pins are disposed in the openings of the ear-like protuberances to maintain the stacked array in stable radial and transverse configuration. In preferred embodiments, each ceramic plate includes four retaining bosses evenly distributed around the periphery of the ceramic plate. When disposed in the plurality of stacked plates, at least two of the retaining bosses are disposed to be located adjacent the integrally formed spacers on the ceramic plate.

Figure 2:
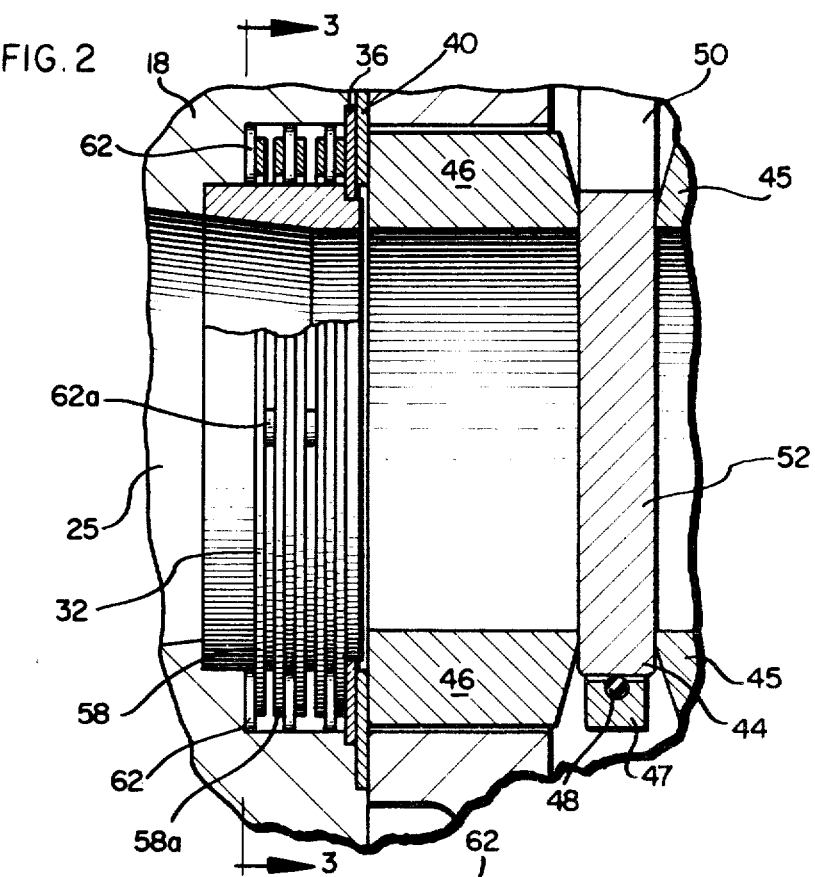
FIG. 2 illustrates an enlarged fragmented side view of one preferred embodiment of the ceramic spring urging directly against a retaining washer and then a Grafoil (flexible heat resistant material, such as Grafoil) seal disposed between the valve seat and the housing, thereby to urge the valve seat into sealing engagement with the valve gate, and showing the disposition of the spacers in staggered array radially around the washer-shaped spacer plates.

Referring now to the drawing and to FIGS. 1 and 2 in particular, the improved ceramic gate valve of the present invention is generally designated at 11. Such improved ceramic gate valve 11 is disposed on a conduit pipe (not shown) for controlling the flow of a fluid therethrough. Gate valve 11 includes a valve housing 12 which comprises a central section 14 and oppositely disposed end sections 16, 18. Each of the end sections 16, 18 is connected to the middle section 14 by means of bolts 20. Assuming a right to left flow of fluid through the conduit pipe, as shown at Arrow A, end portion 16 of housing 12 has an influent opening 22 leading into an influent chamber 23, and end portion 18 of housing 12 includes an effluent opening 24 leading from an effluent chamber 25. Each of the end portions 16, 18 of housing 12 includes, at the interior surface of each, a spring accommodating chamber 26, 28 for containing the ceramic springs respectively 30, 32, the solid washers respectively 34, 36, and respectively the washer-shaped seals 38, 40 which are exposed internally of the solid washers 34, 36.

The central section 14 of housing 12 includes an interior chamber 42 for containing the valve gate 44, which is reciprocally movable transversely as shown at Arrow B. The position shown in phantom lines in FIG. 1 is the open position, and the position shown in the solid lines is the closed position of valve gate 44. Also contained within the chamber 42 are valve seats 45, 46 which are urged inwardly by ceramic springs 30, 32 for engagement with gate valve 44. Valve gate 44 is surrounded at its periphery by a compression means 47 for adding strength to the valve gate. A retaining ring 48 made of a flexible heat resistant material such as Grafoil is disposed intermediate the compression means 46 and the peripheral surface of the valve gate 44 for avoiding shock due to differing rates of thermal expansion and contraction between the compression means 47 and valve gate 44.

As shown in FIG. 1, valve gate 44 includes an aperture therein 50 for permitting flow therethrough when the valve gate is disposed in the first position (shown in phantom lines). The valve gate 44 also includes a solid portion 52 for closing the valve when the valve gate 44 is in the second position (as shown in solid lines in FIGS. 1 and 2).

Reciprocation means of the type generally known in the art and as shown in FIG. 1 comprise a connecting rod 54 attached to a shaft 56 which is screw operated by means not shown.

Figure 3:
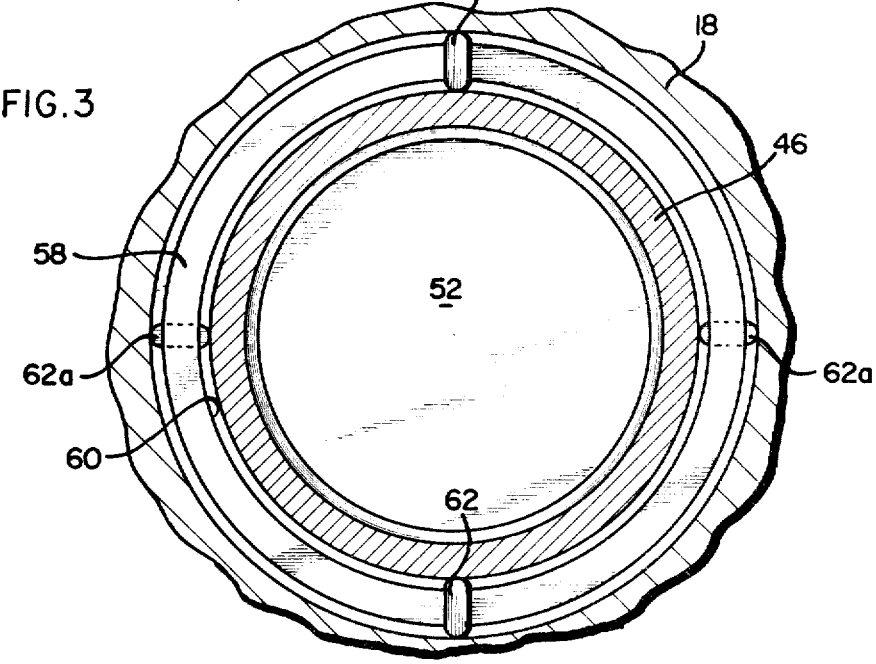
FIG. 3 is a sectional view taken along line 3—3 of FIG. 2, shows a transverse cross-section of the ceramic spring embodiment of FIG. 2, and further illustrates the ceramic spring contained within a portion of the housing (shown fragmented), further showing interior of and behind the ceramic spring a portion of the valve seat, with a pair of spacer tabs disposed at 0° and 180° respectively on the periphery of the first washer-shaped spacer plate, and yet further showing in partial phantom lines a second pair of spacer tabs disposed at 90° and 270° respectively between the first washer-shaped ceramic plate and the next ceramic plate.

Referring now to FIGS. 2 and 3 which illustrate one preferred embodiment of the ceramic spring 32 of the present invention. The ceramic spring 32 includes a plurality of ceramic plates 58 which are shown in this embodiment as being in the shape of circular washers. The ceramic plates 58 each has a central hole 60 therein. The central hole 60 is preferably the same size as the aperture 50 in valve gate 44 to promote non-turbulent flow of fluid through valve 11.

In the embodiment of FIGS. 2 and 3, spacers 62 are supplied in the form of discrete components, although such spacers may be integrally formed as shown in FIGS. 4–8. The spacers 62 have a thickness which is selected to effect the desired distance of separation of the ceramic spring plates 58 in the longitudinally stacked array as shown. The spacers 62 have a width dimension as shown in FIGS. 2 and 3 which is sufficient to contact adjacent ceramic plates at only a limited radial portion thereof, to leave an extended radial portion therebetween. The spacers 62 are disposed in a staggered array, preferably in pairs as shown in the embodiment of FIGS. 2 and 3 at 0° and 180° for separation between one ceramic plate 58 and the next ceramic plate 58a, and the next pair of spacers 62a (shown in partial phantom lines in FIG. 3) are disposed at 90° and 270°. This pattern is repeated for subsequent groups of spacers as shown in FIG. 2 thereby to sum the resilient force of the ceramic plates.

The alternative preferred embodiment of FIGS. 4 through 6 illustrates washer-shaped ceramic plates 158 which have integrally formed spacers 162 thereon. These integrally formed spacers 162 are in the form of increased thicknesses of the ceramic plates 158, and are oppositely disposed on each ceramic plate 158 as shown in FIG. 5. As shown in FIG. 6, the staggered relationship is maintained, wherein the spacers 162 are disposed at 0° and 180° for one ceramic plate 158, with the integrally formed spacers 162a being disposed at 90° and 270° for the next ceramic plate 158a.

The alternative preferred embodiment as shown in FIGS. 4 through 6 also includes a pair of integrally formed retaining bosses 163 in the form of ear-like projections extending from the periphery of ceramic plate 158. These ear-like projections are preferably disposed adjacent the integrally formed spacers 162. Each retaining boss includes a pin receiving opening 164 for receiving and accommodating a pin 165 in order to maintain lateral and radial stability for the stacked array of ceramic plates 158, whereby twisting of the same which would decrease the spring function is prevented.

Figure 7:
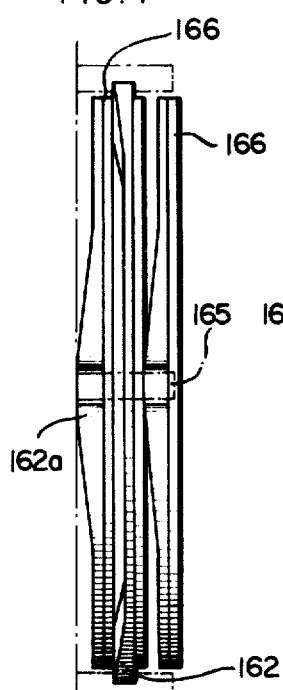
FIG. 7 illustrates an enlarged side view of a further alternative preferred embodiment of the ceramic spring of the present invention wherein an additional ceramic plate having planar-face surfaces is applied as backing to each of the ceramic plates having integrally formed spacers thereon to provide a stiffer spring function.
Figure 8:
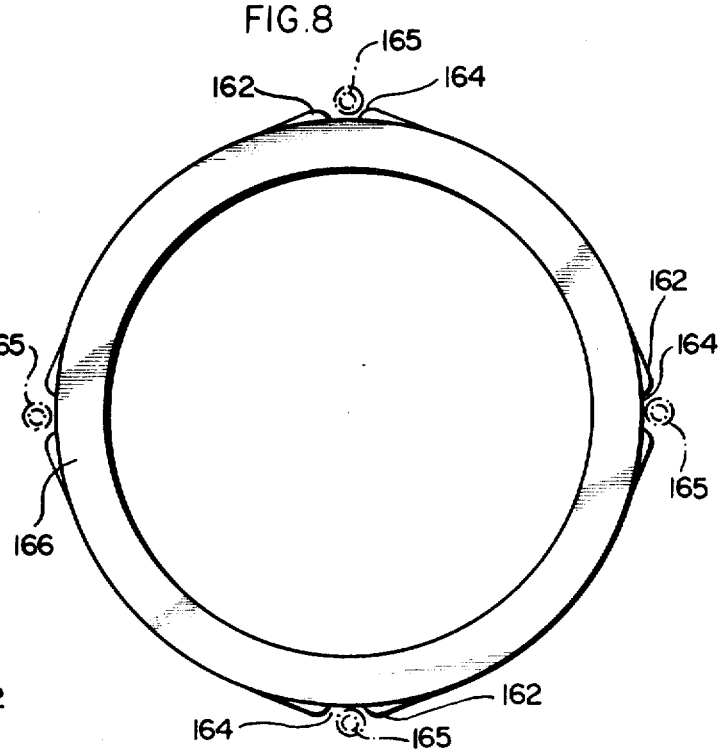
FIG. 8 is an enlarged transverse view of the embodiment of the ceramic spring of FIG. 7, and further showing the engagement of the retaining pins with the ear-like projections of the retaining bosses similar to those illustrated in FIG. 6, supra.

The embodiment of FIGS. 7 and 8 is similar to that of FIGS. 4 through 6, but with the inclusion of supplemental backing plates 166 which have substantially planar faces to stiffen the spring action of the stacked ceramic spring.

Figure 9:
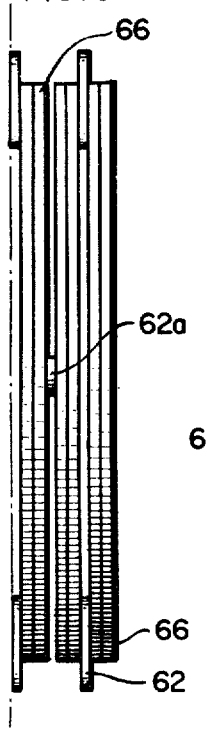
FIG. 9 is an enlarged side view of a yet further alternative preferred embodiment of the ceramic spring, which is similar to the embodiment of FIGS. 2–3 with addition of a further spring plate having planar-face surfaces and which is applied as a backing to each of the spring plates of the embodiment of FIGS. 2–3 for increased force of the spring.
Figure 10:
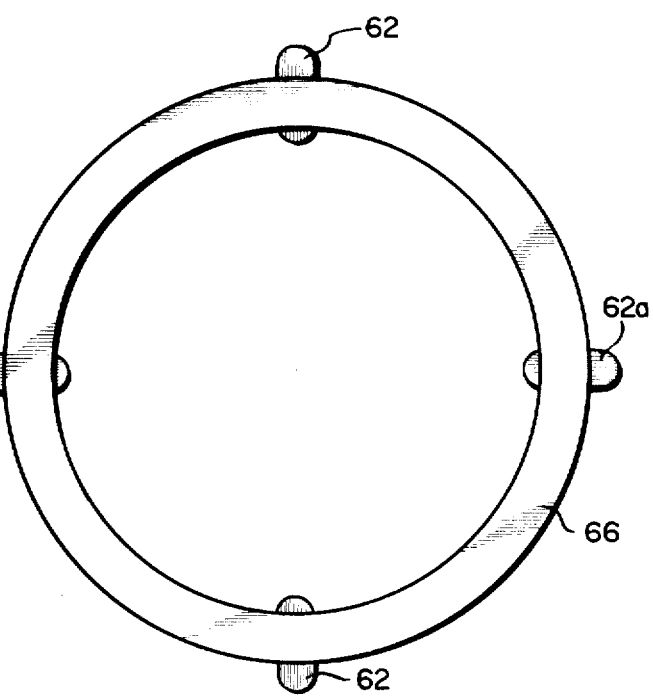
FIG. 10 is an enlarged transverse view of the ceramic spring embodiment of FIG. 9, which is similar to that of FIG. 3, and showing the evenly and staggerly arranged discrete spacers of such embodiment.

The embodiment of FIGS. 9 and 10 is similar to the embodiment of FIGS. 2 and 3, but with the inclusion of such supplemental planar faced backing plates 166, again for stiffening the spring action of the ceramic spring designated at 66.

The basic and novel characteristics of the improved ceramic gate valve and components therefor of the present invention will be readily understood from the foregoing disclosure by those skilled in the art. It will become readily apparent that various changes and modifications may be made in the form, construction and arrangement of the improved ceramic gate valve and components therefor of the present invention as set forth hereinabove without departing from the spirit and scope of the invention. For example, without limitation, it is contemplated that the spring force generated by the various embodiments of the ceramic springs of the present invention may be varied by selecting various spring plate thicknesses, exterior and interior spring plate diameters, number of stacked plates, number and radial disposition of spacers per plate, radial extent of each spacer, *inter alia*. However, the preferred and alternative embodiments of the present invention set forth hereinabove are not intended to limit such spirit and scope in any way.

What is claimed is:

1. An improved ceramic gate valve apparatus for controlling the flow of high temperature and corrosive fluids through a conduit pipe having a longitudinal dimension, said valve comprising:

a valve housing disposed on the conduit pipe, said valve housing having influent openings and effluent openings connected to said conduit pipe, said valve housing having a valve gate containing chamber internally thereof and disposed transverse to the longitudinal dimension of said conduit pipe;

a valve gate disposed in said valve gate containing chamber for reciprocating movement between a first position to open said valve and a second position to close said valve and positions intermediate said first and second positions for reduced and controlled flow through the conduit pipe, said valve gate comprised of a ceramic material and defining a slab shape of relatively lesser width in the direction of the longitudinal dimension of said conduit pipe and relatively greater width in the transverse dimension, said valve gate having a valve gate aperture therein for permitting flow therethrough when the valve gate is disposed in said first position, said valve gate having a solid portion disposed opposite said valve gate aperture for closing said valve when said valve gate is in said second position;

a pair of valve seats each of which is disposed on an opposite side of and engages said valve gate, said valve seat comprised of a ceramic material, each said valve seat having an opening therein to permit flow from the conduit pipe therethrough when said valve gate is in the first position, each said valve seat being substantially stationary in the transverse dimension and each said valve seat being disposed for inward urging in the longitudinal direction for snug engagement with said valve gate;

reciprocating means connected to said valve gate for disposing said valve gate between said first and second positions to open and close respectively said valve;

compression means surrounding said ceramic valve gate for providing an inwardly compressive force to the peripheral surface thereof to increase the strength thereof; and ceramic springs disposed exterior of each said valve seat for urging the valve seat pair inwardly toward and into engagement with said ceramic valve gate with sufficient force to effect a slideable but sufficiently snug engagement, and to prevent leakage of the conducted material around the engagement seal between said ceramic valve seat and said ceramic valve gate.

2. The improved ceramic gate valve of claim 1 wherein said housing interior chamber for containing said valve gate includes a portion for accommodating said aperture portion of said ceramic valve gate when said valve gate is in said second position and an oppositely disposed portion for accommodating said solid portion of said ceramic valve gate when said gate is in said first position.

3. The improved ceramic gate valve of claim 1 wherein a washer of solid and laterally stable form is disposed between said ceramic valve seat and said ceramic spring means.

4. The improved ceramic gate valve of claim 3 further comprising a flexible, washer-shaped seal having a larger external diameter than said solid washer and disposed intermediate said solid washer and said ceramic valve seat at a portion near the internal diameter of said seal for transmitting inwardly urging force from said ceramic spring to said ceramic valve seat and for sealing said housing.

5. The improved ceramic gate valve of claim 4 wherein said seal comprises a Grafoil (flexible heat resistant material, such as Grafoil) material.

6. The improved ceramic gate valve of claim 1 further comprising a retaining ring made of flexible, heat resistant material disposed intermediate said compression means and said valve gate peripheral surface for avoidance of shock due to differing rates of thermal expansion and contraction between said compression means and said valve gate.

7. The improved ceramic gate valve of claim 1 wherein said ceramic spring comprises:
   a plurality of ceramic plates having a central hole therein for flow of the conducted fluidic material therethrough, each said plate being deformable under an applied load of selected amount and further being resilient upon removal of the load, said plurality of ceramic plates disposed in longitudinally stacked array to exert a collective force for opposing the applied load;
   spacers disposed between adjacent ceramic plates in said stacked array and near the respective peripheries thereof, each said spacer having a thickness for defining the separation adjacent said plates in the longitudinally stacked array, each said spacer having a width dimension sufficient to contact adjacent ceramic plates at a limited radial portion thereof, with a group of at least two of said spacers disposed between each pair of adjacent ceramic plates, each said group of spacers being oppositely and evenly disposed around the periphery of adjacent ceramic plates, and said group of spacers is disposed in staggered array along said longitudinal stack of ceramic plates.

8. The improved ceramic gate valve of claim 7 wherein no group of spacers is disposed directly longitudinally in line with the next group of spacers in the stack of ceramic plates and spacers.

9. The improved ceramic gate valve of claim 7 wherein the central hole of each of the ceramic plates is of circular shape in transverse cross-section to form a washer shape, and said central hole has substantially the same diameter as the aperture in said valve gate.

10. The improved ceramic gate valve of claim 8 wherein said ceramic plates are circular in exterior shape to form a circular washer shape.

11. The improved ceramic gate valve of claim 7 wherein one group of spacers comprises a pair which are respectively disposed opposite each other at 0° and 180°, and wherein the next group of spacers comprises a pair which are disposed opposite each other and staggered from the first group at 90° and 270°, and wherein subsequent groups of spacers repeat said opposite staggered relationship, thereby to sum the resilient force of the ceramic plates directed opposite the load.

12. The improved ceramic gate valve of claim 7 wherein each group of spacers separates two ceramic plates which are disposed in facing relationship to each other.

13. The improved ceramic gate valve of claim 7 wherein said spacers comprise discrete tabs.

14. The improved ceramic gate valve of claim 13 wherein said discrete tabs are formed from a heat and corrosion resistent metallic substance.

15. The improved ceramic gate valve of claim 7 wherein said spacers are integrally disposed on said plates in the form of protuberances on the facing surfaces of the periphery thereof.

16. The improved ceramic gate valve of claim 7 wherein each said plate includes at least two integrally formed retaining bosses for indexing said plates into a stacked array having a substantial lateral and radial stability.

17. The improved ceramic gate valve of claim 16 wherein said retaining bosses comprise ear-like projections having a pin receiving opening therein and which extend from the peripheral surfaces of said ceramic plates, and further comprising retaining pins disposed in said openings, whereby the stacked array is maintained.

18. The improved ceramic gate valve of claim 16 wherein each ceramic plate has four retaining bosses evenly disposed around the periphery of each said ceramic plate, and at least two of which retaining bosses are disposed adjacent one of said spacers.

* * * * *